(12) United States Patent
Saffre

(10) Patent No.: US 8,782,659 B2
(45) Date of Patent: Jul. 15, 2014

(54) ALLOCATION OF PROCESSING TASKS BETWEEN PROCESSING RESOURCES

(75) Inventor: Fabrice T P Saffre, Ipswich (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 334 days.

(21) Appl. No.: 13/147,184

(22) PCT Filed: Jan. 27, 2010

(86) PCT No.: PCT/GB2010/000129
§ 371 (c)(1),
(2), (4) Date: Jul. 29, 2011

(87) PCT Pub. No.: WO2010/086599
PCT Pub. Date: Aug. 5, 2010

(65) Prior Publication Data
US 2011/0283292 A1    Nov. 17, 2011

(30) Foreign Application Priority Data
Jan. 30, 2009 (EP) .................................... 09250250

(51) Int. Cl.
G06F 9/46    (2006.01)
(52) U.S. Cl.
USPC .......................................... 718/104; 718/105
(58) Field of Classification Search
USPC .......................................................... 718/5
See application file for complete search history.

(56) References Cited

U.S. PATENT DOCUMENTS

| | | | | |
|---|---|---|---|---|
| 5,379,428 A | * | 1/1995 | Belo | ............................. 718/103 |
| 5,511,194 A | * | 4/1996 | Shirakata et al. | ............. 718/104 |
| 5,724,600 A | * | 3/1998 | Ogi | ................................ 712/11 |
| 6,128,642 A | | 10/2000 | Doraswamy et al. | |
| 2009/0150898 A1 | * | 6/2009 | Sohn et al. | ..................... 718/105 |

OTHER PUBLICATIONS

International Search Report for PCT/GB2010/000129, mailed Jul. 5, 2010.
Written Opinion of the International Searching Authority for PCT/GB2010/000129, mailed Jul. 5, 2010.
European Search Report for EP Application No. 09250250, dated Oct. 7, 2009.
Canright, G., "Chemotaxis-Inspired Load Balancing", COMPLEXUS, vol. 3, No. 1-3, (Aug. 25, 2006).
Babaoglu, O. et al., "Design Patterns from Biology for Distributed Computing", ACM Transactions on Autonomous and Adaptive Systems, vol. 1, No. 1, (Sep. 2006), pp. 26-66.

* cited by examiner

*Primary Examiner* — Van Nguyen
(74) *Attorney, Agent, or Firm* — Nixon & Vanderhye P.C.

(57) ABSTRACT

Processing tasks are allocated between a plurality of processing resources. Each of the processing resources has associated therewith one or more queues for holding tasks awaiting processing. Each of the tasks has a task-type indication identifying the task as belonging to one of a plurality of predetermined task-types. At least one of the plurality of processing resources selects one of the plurality of task-types and transfers one or more tasks of that task-type to another of the processing resources.

13 Claims, 3 Drawing Sheets

ALLOCATION OF PROCESSING TASKS BETWEEN PROCESSING RESOURCES

This application is the U.S. national phase of International Application No. PCT/GB2010/000129, filed 27 Jan. 2010, which designated the U.S. and claims priority to EP Application No. 09250250.9, filed 30 Jan. 2009, the entire contents of each of which are hereby incorporated by reference.

TECHNICAL FIELD

The present invention relates to the allocation of processing tasks between processing resources such as server computers. More specifically, aspects of the present invention relate to methods, apparatus and systems for the re-allocation of processing tasks between members of a group of associated or collaborating processing resources.

BACKGROUND TO THE INVENTION AND PRIOR ART

Various different types of collaborative and/or distributed computing are known by various terms such as "Grid Computing", "Cluster Computing" and "Cloud Computing" which may overlap with each other to some extent.

Grid computing may be thought of as the application of several computers to a single problem at the same time, the problem being sufficiently demanding of processing time or "power" (due to it requiring a very high number of computer processing cycles, or access to large amounts of data) that it may only realistically be completed within a reasonable amount of time by sharing it between several computers. Grid computing depends on software to divide and apportion pieces of a program among several computers, sometimes up to many thousands. Grid computing can also be thought of as distributed and large-scale cluster computing, as well as a form of network-distributed parallel processing. It can be small—confined to a network of computer workstations within a corporation, for example—or it can be a large, public collaboration across many companies or networks.

Grid computing may be thought of as a form of distributed computing whereby a cluster of networked, loosely-coupled computers effectively act together as a single, virtual, supercomputer in order to be able to perform very large tasks. This concept has been applied to computationally-intensive scientific, mathematical and academic problems, and has been used for applications such as drug discovery, economic forecasting, seismic analysis, back-office data processing etc.

Grid computing can be distinguished from conventional cluster computing systems in that grids tend to be more loosely coupled, heterogeneous, and geographically dispersed. The term "cloud computing" meanwhile relates to collaborative or distributed Internet ("cloud") based development and use of computer technology, often based on the idea that processing and data storage may be done "in the cloud" from the point of view of the user or client, who is thus able to perform the same or similar actions irrespective of location, and from any of a variety of different "thin" user terminals with little more than basic browser functionality provided the user terminal currently in use is in communication with the "cloud".

Evening the load over a population of processing units may be an important element of grid, cloud, cluster, or other types of collaborative computing, as it is in this way that idling resources can be used to relieve overloaded ones, increasing the overall throughput of the whole population, and, by spreading peaks in demand more equally between units, decreasing the processing requirements that may be expected of any one unit.

With grid computing for example, in most cases, the workload distribution is coordinated centrally by a resource broker. However, because this approach doesn't scale well, researchers have been looking at ways of achieving global load-balancing through decentralised workload distribution techniques.

One of these decentralised techniques is elegantly simple and involves mimicking the natural process of chemical diffusion. Essentially, each processing node in the system monitors the length of its local queue relative to that of some predefined potential "collaborators". Periodically, a fraction of the difference is transferred between neighbours so as to even the load. For instance if node X has 10 jobs queuing (hereafter written X[10]) and node Y has only 4 (Y[4]), then k(10-4) jobs are transferred from X to Y, where k is a parameter representing the maximum fraction of the total workload transferable in a single attempt. For instance, if k=1/3, in the above example, 6/3=2 jobs will be transferred, resulting in the configuration X[8],Y[6] which is closer to a homogeneous workload distribution. Assuming Y has a second collaborator Z with, say, a queue of 3 (Z[3]), then the next step could result in a configuration of X[8],Y[5],Z[4], then X[7],Y[6],Z[4], i.e. the workload is progressively distributed more evenly, without the need for any central planning. Variants of this model include "chemotaxis", in which a second signal representing the availability of local resources also diffuses, so as to "guide" the workload towards the region of the system where it will be most rapidly processed, through asymmetrical diffusion. This is explained in more detail in the following article: Canright, G., Deutsch, A., Urnes, T.: "Chemotaxis-Inspired Load Balancing", COMPLEXUS, VOL 3; NUMBER 1-3, pages 8-23 (2006).

SUMMARY OF THE INVENTION

The present inventor has realised that the procedure described above fails to include a counterpart for, or take into account a critical aspect which is of importance in the field of chemical diffusion, namely the volatility of the diffusing substance. Indeed, in many cases, the substance will not just diffuse "through" the system, it will also evaporate "out" of it. If the substance is highly volatile (or the environmental conditions favour evaporation), diffusion can be very limited as a result. This can be illustrated, for instance, by comparing the results of pouring alcohol with the results of pouring water at the centre of a sheet of absorbent paper: Because alcohol is more volatile and so evaporates more quickly, the diameter of the "stain" (resulting from diffusion within the substrate) will generally be smaller for alcohol than for an equal volume of water. The equivalent of this "volatility" in collaborative computing may be taken to be the rate at which job requests are cancelled or withdrawn from a queue. However, unlike in a real chemical system, because diffusion is "simulated" and the diffusion coefficient k is a "tuneable" parameter (within certain limits), it is possible to compensate for higher volatility by increasing the value of k. The present inventor has realised the possibility and potential advantages of taking into account an indication of the "half-life" of job request types when computing the corresponding "diffusion coefficients". A possible result of doing this is a reduction in the number of job cancellations due to excessive queuing time. Load-balancing taking account of this additional factor may be used to increase the probability that high-priority or urgent tasks are processed before being withdrawn, in particular in relation to any of the collaborative types of computing discussed earlier.

According to a first aspect, there is provided a method of allocating processing tasks between a plurality of processing resources, each of said processing resources having associated therewith one or more queues for holding tasks awaiting processing, each of said tasks having a task-type indication identifying the task as belonging to one of a plurality of predetermined task-types; the method comprising a first one of said plurality of processing resources performing the following steps;

monitoring tasks in said one or more queues associated with said first processing resource and obtaining therefrom, for each of a plurality of task-types, a load-value indicative of the number of tasks of that task-type awaiting processing and a withdrawal rate value indicative of a rate at which tasks of that task-type are being withdrawn from said one or more queues without having been processed by said first processing resource;

in respect of each of said plurality of task-types, obtaining information from another processing resource indicating the number of tasks of that task-type awaiting processing in a queue associated with said other processing resource;

in respect each of a plurality of task-types for which said first processing resource has a higher number of tasks of that task-type awaiting processing in an associated queue than said other processing resource, obtaining in dependence on said obtained withdrawal rates a relative withdrawal rate value indicative of the rate at which tasks of that task-type are being withdrawn without having been processed, relative to the rate at which tasks of one or more others of said plurality of task-types are being withdrawn without having been processed;

selecting one of said plurality of task-types in dependence on said relative withdrawal rate values and transferring one or more tasks of that task-type to said other processing resource.

The task-type indication of a task may comprise an indication of a client entity which has requested processing of the task or a sender entity from which a request for processing of the task has been received. Other types of task-type indications may be used, including indications relating directly or indirectly to characteristics such as expected processing time for the tasks, type of processing required, or their importance or urgency as decided by the requesting client, for example. It will be understood however that preferred embodiments are not dependent on tasks arriving with an indication of a deadline by which they are required to be processed, a "time-to-live" (TTL) before they will be withdrawn, or a pre-determined priority level at which they should be treated. Instead, the selection of tasks for transfer from a particular processing resource may be done purely in dependence on values obtained from monitoring tasks in the queue(s) of that resource, and on information obtained from other processing resources which, similarly, need not be provided with deadlines by which tasks are required to be processed, TTLs before they will be withdrawn, or pre-determined priority levels.

The processing resources may each have associated therewith respective queues for tasks of each task-type awaiting processing. In some embodiments, however, tasks of different task-types may be held in a common queue, provided the tasks are distinguishable sufficiently for the steps set out above to be performed in relation to the different task-types.

The withdrawal rate value for a particular task-type may be obtained by monitoring the amount of time tasks of that task-type remain in a queue awaiting processing before being withdrawn. Alternatively, the withdrawal rate value for a particular task-type may be obtained by monitoring the number of tasks of that task-type that are withdrawn without having been processed during a predetermined period of time. This alternative allows for the withdrawal rate value to reflect the difference between the situation where one task is withdrawn after a certain period of time, and the situation where two tasks, both received at the same time, are both withdrawn after that same period of time.

The selecting step may be performed in dependence on a function of the relative withdrawal rate values such that a task of a task-type having a withdrawal rate value indicative of a higher withdrawal rate is more likely to be transferred than a task of a task-type having a withdrawal rate value indicative of a lower withdrawal rate, i.e. in a probabilistic manner. Alternatively or additionally, the selecting step may be performed in dependence on a function of the relative withdrawal rate values such that a task of a task type having a withdrawal rate value indicative of a higher withdrawal rate is transferred in preference to a task of a task type having a withdrawal rate value indicative of a lower withdrawal rate, i.e. in a more deterministic manner.

The method may further comprise monitoring the processing of tasks and determining therefrom, for each of a plurality of task-types, a processing time value indicative of the amount of processing time taken to process each task of that task-type. The selecting step may then be performed in dependence on processing time values determined in respect of the plurality of task-types. This enables account to be taken of different task-types taking up different amounts of processing time, which may influence the selection of tasks for transfer.

The selecting step may comprise transferring more than one task of the selected task-type, thereby enabling larger disparities in queue backlogs to be evened out more rapidly. The number of tasks transferred may be determined in dependence, for example, on one or more of the following criteria:

the processing capability of other processing resources (which may allow the first processing resource to perform the determination in dependence on a comparison between its own processing capability and that of the other processing resources);

a measure of the amount of processing time taken to process tasks of the selected task-type;

a measure of network capacity available between the processing resources for transferring of tasks;

the number of tasks either of the selected task-type or of any task-type being held awaiting processing by the first processing resource;

the difference between the number of tasks either of the selected task-type or of any task-type being held awaiting processing by the first processing resource and the number of tasks either of the selected task-type or of any task-type being held awaiting processing by the other processing resource.

According to preferred embodiments of the first aspect, some or all of a group of collaborating processing resources may each be performing a method as set out above substantially contemporaneously, or in turn, allowing them to transfer tasks to each other in any of the above manners, i.e. more than one processing resource performing the method attributed to the "first processing resource". By virtue of this, two-way transfers may be performed between any two such processing resources.

According to a second aspect, there is provided a first processing resource having one or more other processing resources associated therewith, each of said processing resources having associated therewith one or more queues for holding tasks awaiting processing, each of said tasks having a task-type indication identifying the task as belonging to one of a plurality of predetermined task-types; said first processing resource comprising:

a task monitor operable to monitor tasks in said one or more queues associated with said first processing resource and to obtain therefrom, for each of a plurality of task-types, a load-value indicative of the number of tasks of that task-type awaiting processing and a withdrawal rate value indicative of a rate at which tasks of that task-type are being withdrawn from said one or more queues without having been processed by said first processing resource;

a task counter operable to obtain, in respect of each of said plurality of task-types, information from one of said other processing resources indicating the number of tasks of that task-type awaiting processing in a queue associated with said other processing resource;

a withdrawal rate comparer operable to obtain, in respect each of a plurality of task-types for which said first processing resource has a higher number of tasks of that task-type awaiting processing in an associated queue than said other processing resource and in dependence on said obtained withdrawal rates, a relative withdrawal rate value indicative of the rate at which tasks of that task-type are being withdrawn without having been processed, relative to the rate at which tasks of one or more others of said plurality of task-types are being withdrawn without having been processed;

a task selector operable to select one of said plurality of task-types in dependence on said relative withdrawal rate values and to transfer one or more tasks of that task-type to said other processing resource.

According to a third aspect, there is provided a processing system comprising a plurality of processing resources, each of said processing resources having associated therewith one or more queues for holding tasks awaiting processing, each of said tasks having a task-type indication identifying the task as belonging to one of a plurality of predetermined task-types; each of said processing resources comprising:

a task monitor operable to monitor tasks in said one or more queues associated with said processing resource and to obtain therefrom, for each of a plurality of task-types, a load-value indicative of the number of tasks of that task-type awaiting processing and a withdrawal rate value indicative of a rate at which tasks of that task-type are being withdrawn from said one or more queues without having been processed by said processing resource;

a task counter operable to obtain, in respect of each of said plurality of task-types, information from another of said processing resources indicating the number of tasks of that task-type awaiting processing in a queue associated with said other processing resource;

a withdrawal rate comparer operable to obtain, in respect each of a plurality of task-types for which said processing resource has a higher number of tasks of that task-type awaiting processing in an associated queue than said other processing resource and in dependence on said obtained withdrawal rates, a relative withdrawal rate value indicative of the rate at which tasks of that task-type are being withdrawn without having been processed, relative to the rate at which tasks of one or more others of said plurality of task-types are being withdrawn without having been processed;

a task selector operable to select one of said plurality of task-types in dependence on said relative withdrawal rate values and to transfer one or more tasks of that task-type to said other processing resource.

The various options and preferred embodiments referred to above in relation to the first aspect are also applicable in relation to the second and third aspects.

With reference again to the terminology of the chemical diffusion analogy discussed earlier, a reasonably straightforward manner of achieving good results is to multiply the benchmark diffusion coefficient by the (relative) evaporation rate (inversely proportional to the "half-life") to obtain request type-specific values of k. These values can then be normalised to account for transfer limitations, for instance if there isn't enough bandwidth. If unavailable at initialisation time, the request cancelling or task withdrawal rate (evaporation) can be progressively evaluated by monitoring the queues in the early stages. In many realistic situations, it is likely that evaporation will not be constant, and that "half-life" should be replaced by a "life expectancy", resulting in less variability between individual jobs within each type (i.e. most requests for one particular service will have similar tolerance to delays). However, although this could be advantageously factored into our function, it need not make any fundamental difference: the logic may remain identical.

BRIEF DESCRIPTION OF THE DRAWINGS

A preferred embodiment of the present invention will now be described with reference to the appended drawings, in which.

DESCRIPTION OF PREFERRED EMBODIMENTS OF THE INVENTION

Figure 1:
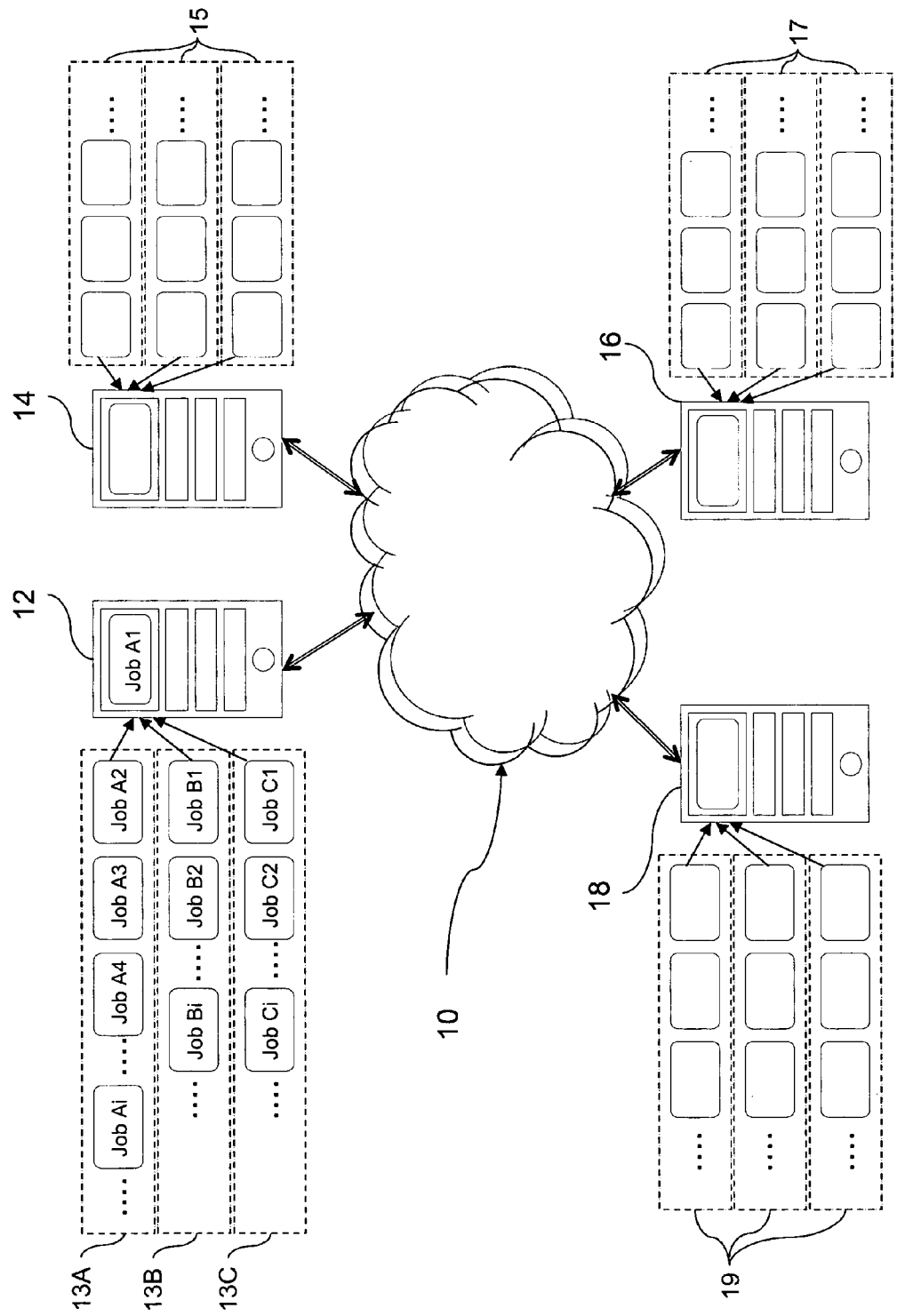
FIG. 1 is a schematic diagram of a group of four server computers linked via a network, one or more of which may perform a method according to an embodiment of the invention.

FIG. 1 shows a group of four server computers 12, 14, 16, 18 linked to each other by means of connections via a network 10, which may be the Internet, an intranet, or any of a variety of other types of communication network. The network 10 may be a switched network, but in some instances the connections between the respective server computers may alternatively be direct one-to-one connections.

Referring to server 12, this is shown processing a first processing task which is of type A, marked as "Job A1". A series of similar processing tasks categorised as being of the same type as "Job A1" are shown waiting to be processed in a job queue 13A. These processing tasks awaiting processing are marked as "Job A2", "Job A3", "Job A4", ... "Job Ai" etc. Server 12 is shown as having two further job queues 13B and 13C containing series of processing tasks of types B and C respectively.

As with server 12 and its job queues 13, servers 14, 16 and 18 have job queues 15, 17 and 19 respectively.

Figure 2:
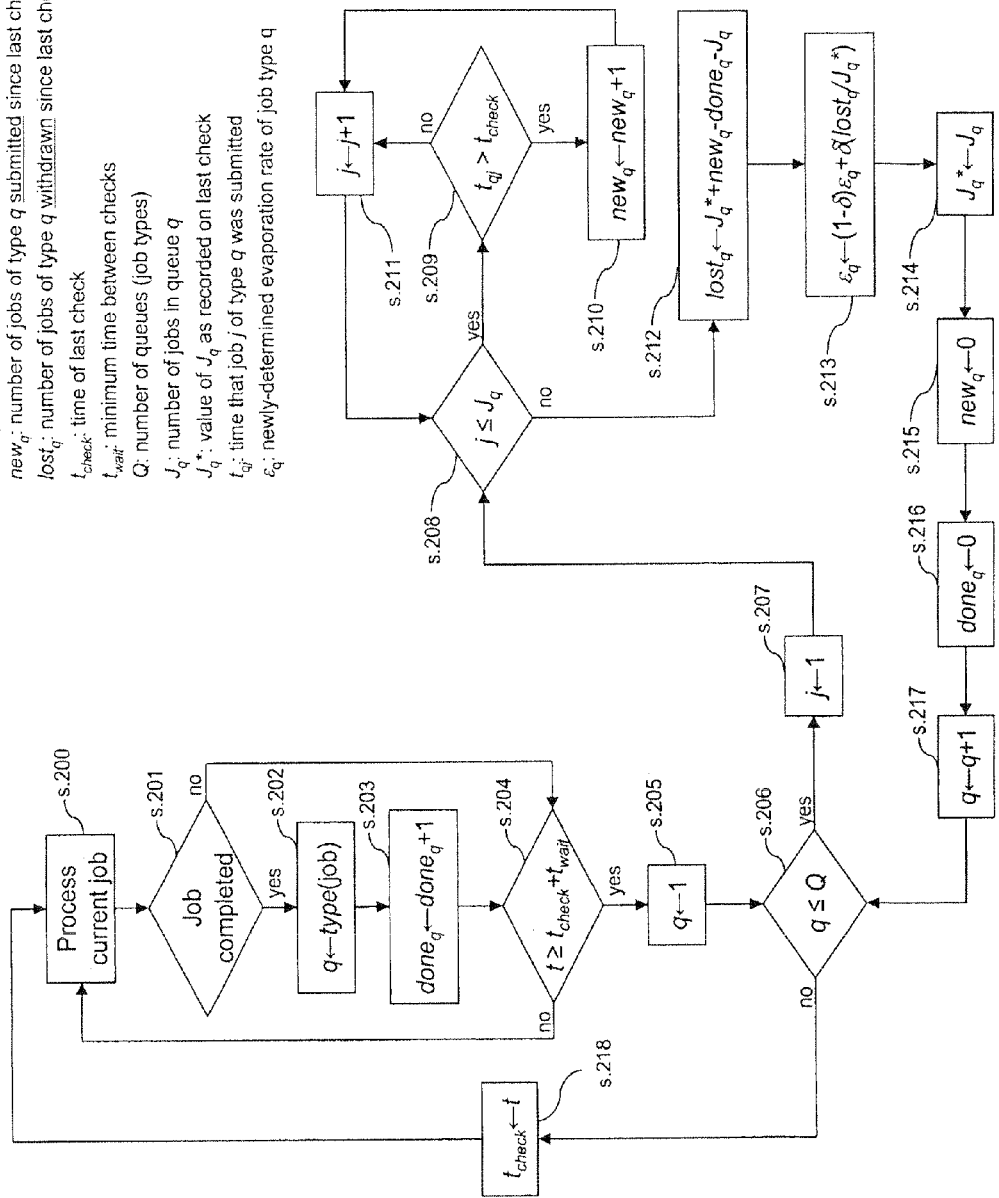
FIG. 2 is a flow-chart illustrating a process by which a server computer may perform "internal" queue monitoring in respect of tasks in its own queue or queues.
Figure 3:
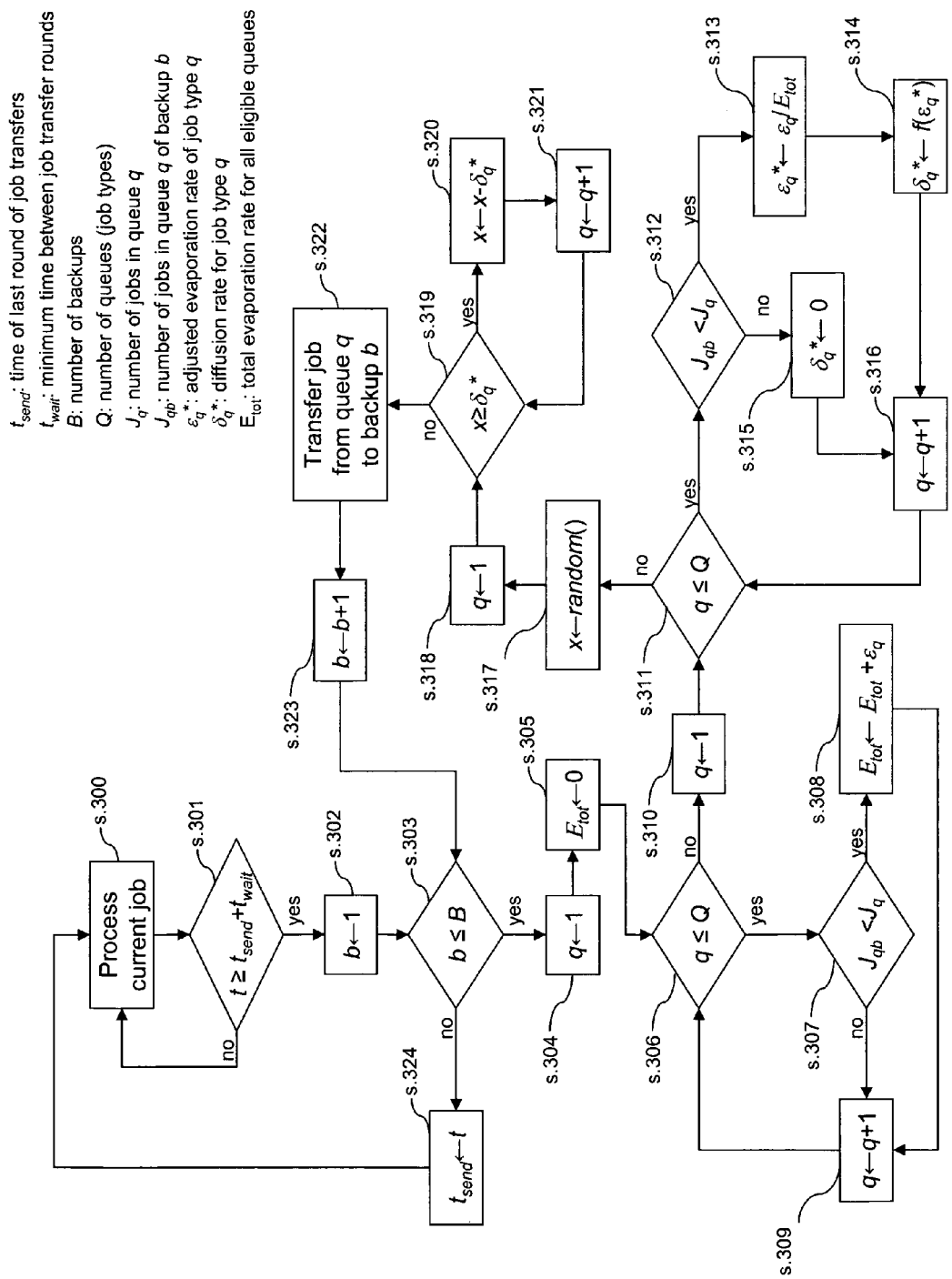
FIG. 3 is a flow-chart illustrating a process by which a server computer may perform queue management in conjunction with one or more other server computers.

With references to FIGS. 2 and 3, the following is an explanation of how one or more of server computers 12, 14, 16, 18 may determine whether to transfer one or more processing tasks to one or more other server computers. The explanation will be given with reference to server computer 12 as the server computer monitoring its job queues 13A, 13B, 13C, . . . and determining whether to transfer one or more processing tasks to one or more of three other server computers 14, 16, 18, . . . in dependence on the results of its own queue monitoring and also on information received from the other server computers 14, 16, 18, . . . relating to the state of their respective job queues 15, 17, 19, . . . . It will be understood that the server computers 14, 16, 18, . . . may at the same time be performing similar monitoring with a view to determining whether to transfer tasks to other server computers, resulting in the possibility of tasks being transferred in either direction between any of the server computers in the system, but to simplify the explanation, the explanation will be given concentrating on the processing that would be performed by server computer 12 with a view to transferring tasks outward, rather than inward.

FIG. 2 illustrates the "internal" queue monitoring processes that server computer 12 performs in respect of its own tasks A1, A2, . . . , B1, B2, . . . , C1, C2, . . . etc. and its own job queues 13A, 13B, 13C, . . . etc. FIG. 3 illustrates the queue management processes that server computer 12 performs in relation to determining whether to transfer one or more processing tasks to one or more of the other server computers 14, 16, 18, . . . in dependence on information determined from the "internal" queue monitoring described with reference to FIG. 2 and on information determined from the other server computers. It will be understood that the processes illustrated in FIGS. 2 and 3 may be performed contemporaneously by server computer 12.

"Internal" Queue Monitoring:

As indicated in FIG. 2, server computer 12 may be regarded as processing jobs continuously (step s200), the first of which is shown in FIG. 1 as "Job A1". Whenever a job is completed (s201), a counter for that type of job ($done_q$) is incremented (s202, s203).

At regular intervals of approximate duration $t_{wait}$, server computer 12 updates its estimate of the "evaporation rate" $\epsilon_q$ for each job type q. This is achieved by ascertaining whether a period of time $t_{wait}$ has elapsed since the time $t_{check}$ of the previous cycle (s204).

For each of the job types/queues (q=1 through Q) (s205, s206), server computer 12 inspects each of the jobs (j=1 through $J_q$) (s207, s208, s211) to determine whether it was already accounted for at the last evaluation (i.e. if the timestamp $t_{qj}$ is more recent than $t_{check}$, the last time that an estimate of the "evaporation rates" was calculated) (s209). If this is not the case a "newcomers counter" $new_q$ is incremented (s210).

From this information, the number of jobs lost since the last evaluation was performed ($lost_q$) may be deduced (s212). The evaporation rate $\epsilon_q$ for every job type q is then updated (s213), based on the last recorded value of $\epsilon_q$ (multiplied by a weighting factor 1-δ) and the fraction of jobs that were lost since the last estimate ($lost_q/J_q^*$, i.e. the number of jobs lost divided by $J_q^*$, the length of the queue when the "evaporation rate" estimates were last computed).

The various counters are then reset or updated for use in the next round (s214, s215, s216, s217), which is arranged to start once another period of time $t_{wait}$ has elapsed since the newly-set time $t_{check}$ (s218).

As a result of such monitoring according to the above process, server computer 12 determines updated estimates of the respective evaporation rates $\epsilon_q$ of the jobs in each of its own queues.

If acting on its own, without any interaction with other server computers, such information would enable server computer 12 to identify at any stage whether jobs in any of its own queues were liable to be withdrawn before being processed, but other than prioritising jobs from queues ascertained to have higher evaporation rates $\epsilon_q$ over jobs from queues ascertained to have lower evaporation rates $\epsilon_q$, server computer 12 would not be able to take action to prevent jobs from being withdrawn from its queues. By virtue of interactions with other server computers 14, 16, 18, . . . in the manner to be described below with reference to FIG. 3, server computer 12 may be able to transfer to the job queues of the other server computers one or more jobs from its job queues that were otherwise liable to have been withdrawn before being processed.

Queue Management and Transfer of Tasks to Other Server Computers:

As before, and as indicated in FIG. 3, server computer 12 may be regarded as processing jobs continuously (step s300), as may each of the other server computers.

At regular intervals of approximate duration $t_{wait}$, server computer 12 considers sending part of its workload to its neighbouring or collaborating server computers 14, 16, 18, . . . (which will be referred to as "backups") in the collaborative load-balancing overlay (s301). This is achieved by ascertaining whether a period of time $t_{wait}$ has elapsed since the time $t_{send}$ of the previous transfer cycle (s301). It should be noted that this $t_{wait}$ does not have to have the same value as that used in the "internal" processing according to the flow-chart of FIG. 2.

For all backups (b=1 through B) (s302, s303, s323) and for all job types/queues (q=1 through Q) (s304 to s309), server computer 12 checks whether that particular queue is shorter at backup b than locally ($J_{qb} < J_q$) (s307). If this is the case, then type q is a potential candidate for a job transfer and $E_{tot}$, the "total evaporation rate" for all eligible queues, having been reset to zero (s305) for the current transfer cycle, is incremented by $\epsilon_q$ (s308).

Starting again from the first queue (s310) and considering each in turn (s311 to s316), for all eligible queues, i.e. those for which it is found (s312) that $J_{qb} < J_q$, an "adjusted" evaporation rate $\epsilon_q^*$ is calculated (s313). This is based on the evaporation rate previously (and most recently) determined for job type q relative to the total evaporation rate for all (currently) eligible queues $E_{tot}$. From this adjusted evaporation rate $\epsilon_q$, a diffusion rate $\delta_q^*$ is determined as a function of the adjusted evaporation rate $\epsilon_q^*$(s314). Preferably the function $f(\epsilon_q^*)$ is such that the diffusion rates $\delta_q^*$ for the respective job types are proportional to the respective adjusted evaporation rates $\epsilon_q^*$, and my be equal to these, but other functions $f(\epsilon_q^*)$ may be applicable in some circumstances. For any queues/job types determined (at s312) to be not currently eligible, the diffusion rates $\delta_q^*$ is set to be zero (s315).

One job type q is then selected using a standard stochastic procedure in which the probability to select q is directly proportional to $\delta_q^*$ (s317 to s321). It should be noted that the probability to select q need not be directly proportional to $\delta_q^*$—other functions of $\delta_q^*$ may be chosen instead.

One job of the selected type q may then be transferred to backup b (s322). The manner in which this is done will depend on the type of network, and the manner in which the respective server computers are linked to each other. It should be noted that in the flow-chart example, a maximum of one job is transferred for each backup, but in practice, this number could be made to vary as a function of, for example, the processing capability of backup b, the size of the job, the network capacity between server computer 12 and backup b, the number of jobs, either of the selected type or of any type, awaiting processing in the relevant queue(s) of server computer 12, the difference between the number of jobs of the selected type (or of any type) awaiting processing in the relevant queue(s) of server computer 12 and the number awaiting processing in the corresponding queue(s) of backup b, or other factors.

After incrementing b in order to proceed to the next backup (s323), the processing then repeats from step s304 in respect of another backup until it is determined that all backups have been considered (s303), at which point the time $t_{send}$ is set to the current time t (s324) in order to allow job processing to continue (s300) until such time as another period of time $t_{wait}$ has elapsed since the newly-set time $t_{send}$ (s301), at which point a subsequent transfer cycle may be initiated.

While the manner in which tasks initially reach the respective server computers (i.e. prior to performance of the above method) may involve a separate "central" or "administrative" control entity, there are other manners in which this may happen. Each server computer may initially receive tasks from its own client or clients, for example. It will be noted however that there is no requirement for any such control entity to monitor the status at the respective server computers in order for tasks to be re-allocated from one server computer to another.

The invention claimed is:

1. A method of allocating processing tasks between a plurality of processing resources, each of said processing resources having associated therewith one or more queues for holding tasks awaiting processing, each of said tasks having a task-type indication identifying the task as belonging to one of a plurality of predetermined task-types, at least a first one of said plurality of processing resources being associated with at least one other of said processing resources from which said first processing resource is capable of obtaining information and to which said first processing resource is permitted to transfer tasks; the method comprising said first processing resource performing the following steps;

monitoring the presence and withdrawal of tasks in said one or more queues associated with said first processing resource and obtaining therefrom, for each of a plurality of task-types, a load-value indicative of the number of tasks of that task-type awaiting processing and a withdrawal rate value indicative of a rate at which tasks of that task-type are being withdrawn from said one or more queues without having been processed by said first processing resource;

in respect of each of said plurality of task-types, obtaining information from at least one other processing resource with which said first processing resource is associated indicating the number of tasks of that task-type awaiting processing in a queue associated with said other processing resource;

in respect each of a plurality of task-types for which said first processing resource has a higher number of tasks of that task-type awaiting processing in an associated queue than said other processing resource, obtaining, using at least one computer processor, in dependence on said obtained withdrawal rates a relative withdrawal rate value indicative of the rate at which tasks of that task-type are being withdrawn without having been processed, relative to the rate at which tasks of one or more others of said plurality of task-types are being withdrawn without having been processed;

selecting one of said plurality of task-types in dependence on said relative withdrawal rate values and transferring one or more tasks of that task-type to said other processing resource.

2. A method according to claim 1 wherein the task-type indication of a task comprises an indication of a client entity which has requested processing of said task or a sender entity from which a request for processing of said task has been received.

3. A method according to claim 1 wherein said processing resources each have associated therewith respective queues for tasks of each task-type awaiting processing.

4. A method according to claim 1 wherein the withdrawal rate value for a particular task-type is obtained by monitoring the amount of time tasks of that task-type remain in a queue awaiting processing before being withdrawn.

5. A method according to claim 1 wherein the withdrawal rate value for a particular task-type is obtained by monitoring the number of tasks of that task-type that are withdrawn without having been processed during a predetermined period of time.

6. A method according to claim 1 wherein said selecting step is performed in dependence on a function of said relative withdrawal rate values such that a task of a task-type having a withdrawal rate value indicative of a higher withdrawal rate is more likely to be transferred than a task of a task-type having a withdrawal rate value indicative of a lower withdrawal rate.

7. A method according to claim 1 wherein said selecting step is performed in dependence on a function of said relative withdrawal rate values such that a task of a task type having a withdrawal rate value indicative of a higher withdrawal rate is transferred in preference to a task of a task type having a withdrawal rate value indicative of a lower withdrawal rate.

8. A method according to claim 1, further comprising monitoring the processing of tasks and determining therefrom, for each of a plurality of task-types, a processing time value indicative of the amount of processing time taken to process each task of that task-type, wherein said selecting step is performed in dependence on processing time values determined in respect of said plurality of task-types.

9. A method according to claim 1 wherein said selecting step comprises transferring more than one task of said selected task-type.

10. A method according to claim 9 wherein the number of tasks transferred in said selecting step is determined in dependence on one or more of the following criteria: the processing capability of said other processing resource, a measure of the amount of processing time taken to process tasks of the selected task-type; a measure of network capacity available between said processing resources for transferring of tasks; the number of tasks either of the selected task-type or of any task-type being held awaiting processing by said first processing resource; the difference between the number of tasks either of the selected task-type or of any task-type being held awaiting processing by said first processing resource and the number of tasks either of the selected task-type or of any task-type being held awaiting processing by said other processing resource.

11. A method of allocating processing tasks between a plurality of processing resources, each of said processing resources having associated therewith one or more queues for holding tasks awaiting processing, each of said tasks having a task-type indication identifying the task as belonging to one of a plurality of predetermined task-types; the method comprising more than one of said processing resources performing a method according to claim 1 whereby to transfer one or more tasks to another of said processing resources.

12. A first processing resource having one or more other processing resources associated therewith from which said first processing resource is capable of obtaining information and to which said first processing resource is permitted to transfer tasks, each of said processing resources having associated therewith one or more queues for holding tasks awaiting processing, each of said tasks having a task-type indication identifying the task as belonging to one of a plurality of predetermined task-types; said first processing resource comprising:
- a task monitor configured to monitor the presence and withdrawal of tasks in said one or more queues associated with said first processing resource and to obtain therefrom, for each of a plurality of task-types, a load-value indicative of the number of tasks of that task-type awaiting processing and a withdrawal rate value indicative of a rate at which tasks of that task-type are being withdrawn from said one or more queues without having been processed by said first processing resource;
- a task counter configured to obtain, in respect of each of said plurality of task-types, information from one of said other processing resources indicating the number of tasks of that task-type awaiting processing in a queue associated with said other processing resource;
- a withdrawal rate comparer comprising a computer processor, the comparer being configured to obtain, in respect each of a plurality of task-types for which said first processing resource has a higher number of tasks of that task-type awaiting processing in an associated queue than said other processing resource and in dependence on said obtained withdrawal rates, a relative withdrawal rate value indicative of the rate at which tasks of that task-type are being withdrawn without having been processed, relative to the rate at which tasks of one or more others of said plurality of task-types are being withdrawn without having been processed;
- a task selector configured to select one of said plurality of task-types in dependence on said relative withdrawal rate values and to transfer one or more tasks of that task-type to said other processing resource.

13. A processing system comprising a plurality of processing resources, each of said processing resources having associated therewith one or more queues for holding tasks awaiting processing, each of said tasks having a task-type indication identifying the task as belonging to one of a plurality of predetermined task-types, each of said processing resources being associated with at least one other of said processing resources and being configured to obtain information therefrom and to transfer tasks thereto; each of said processing resources comprising:
- a task monitor configured to monitor the presence and withdrawal of tasks in said one or more queues associated with said processing resource and to obtain therefrom, for each of a plurality of task-types, a load-value indicative of the number of tasks of that task-type awaiting processing and a withdrawal rate value indicative of a rate at which tasks of that task-type are being withdrawn from said one or more queues without having been processed by said processing resource;
- a task counter configured to obtain, in respect of each of said plurality of task-types, information from another of said processing resources indicating the number of tasks of that task-type awaiting processing in a queue associated with said other processing resource;
- a withdrawal rate comparer comprising a computer processor, the comparer being configured to obtain, in respect each of a plurality of task-types for which said processing resource has a higher number of tasks of that task-type awaiting processing in an associated queue than said other processing resource and in dependence on said obtained withdrawal rates, a relative withdrawal rate value indicative of the rate at which tasks of that task-type are being withdrawn without having been processed, relative to the rate at which tasks of one or more others of said plurality of task-types are being withdrawn without having been processed;
- a task selector configured to select one of said plurality of task-types in dependence on said relative withdrawal rate values and to transfer one or more tasks of that task-type to said other processing resource.

\* \* \* \* \*